United States Patent [19]

Crotti et al.

[11] Patent Number: 4,688,805
[45] Date of Patent: Aug. 25, 1987

[54] ANNULAR FRONT-SEALING GASKET ASSEMBLY

[75] Inventors: Aldo Crotti, Castelnuovo R.; Orlando Berselli, Vignola, both of Italy

[73] Assignee: Italtractor Meccanica ITM S.p.A., Potenza, Italy

[21] Appl. No.: 913,239

[22] Filed: Sep. 30, 1986

[30] Foreign Application Priority Data

Oct. 31, 1985 [IT] Italy ................. 40117 A/85

[51] Int. Cl.$^4$ ............ F16J 15/32; F16J 15/34
[52] U.S. Cl. ...................... 277/84; 277/92; 277/95; 277/152; 305/11
[58] Field of Search .............. 277/81 R, 82, 84, 85, 277/92, 95, 152, 153, 165; 305/11-13

[56] References Cited

U.S. PATENT DOCUMENTS

| | | | |
|---|---|---|---|
| 2,289,274 | 7/1942 | Krug | 286/11 |
| 3,241,843 | 3/1966 | Hatch et al. | 277/92 |
| 3,940,154 | 2/1976 | Olsson | 277/92 |
| 4,094,516 | 6/1978 | Morley et al. | 305/11 X |
| 4,132,418 | 1/1979 | Roli | 277/92 X |
| 4,195,852 | 4/1980 | Roley et al. | 305/11 X |
| 4,262,914 | 4/1981 | Roley | 277/84 |
| 4,331,339 | 5/1982 | Reinsma | 277/84 |
| 4,469,336 | 9/1984 | Linne | 277/92 |

*Primary Examiner*—Robert S. Ward
*Attorney, Agent, or Firm*—Browdy and Neimark

[57] ABSTRACT

The gasket assembly comprises an annular gasket (20) and a coaxial thrust ring. The central portion of the ring (20) is bounded by two faces (35) and (36) which are parallel and inclined so that the thickness of the central portion remains constant. The face (35) meets a face (34) by way of a portion (37) forming a right angle therewith, and the face (36) meets a face (32) by way of a portion (38) forming a right angle therewith. The contacting surface between the ring (30) and annular cavity (8) and between the gasket (20) and annular cavity (8) do not vary substantially as the degree of compression of the assembly varies; moreover, the deformation to which the ring (300) is subjected is substantially one of flexure. This means that as the degree of compression varies, in proximity to the working position, the axial thrust transmitted by the ring (30) to the annular gasket (28) does not vary substantially.

5 Claims, 3 Drawing Figures

ANNULAR FRONT-SEALING GASKET ASSEMBLY

This invention relates generally to an annular gasket assembly for front-sealing in lubricated or non-lubricated rotary pairs, and more particularly to a compact annular front-sealing gasket assembly acting under severe environmental conditions as in the case of articulated joints between the links of lubricated crawler tracks.

These tracks operate normally under very abrasive environmental conditions, and it is therefore very important for the gasket to effectively protect the engaging surfaces of the pins and bushings from the external environment, and also to prevent escape of lubricant. For this to happen, the thrust by which the gasket ring is pressed against the end surface of the bushing must be not less than a determined optimum value, which is very high. Moreover, this value must remain as constant as possible even though the distance between the radial surfaces between which the gasket acts varies by a few tens of millimeters during use. In this respect, if this value increases, the wear between the gasket and the surface in contact with it becomes too great, whereas if it decreases the sealing action becomes insufficient.

Front-sealing gasket assemblies are known, including an assembly of the present applicant, comprising an annular gasket provided with a frontal seal lip acting against a radial end surface of the bushing under the thrust of a thrust ring of elastomer material compressed into an annular groove formed in that link rigid with the pin.

The main drawback of these known gasket assemblies is that as the degree of compression undergone by the assembly in proximity to its working position increases, the thrust exerted by the thrust ring increases considerably in accordance with a curve the final portion of which has a high slope.

It has been discovered that there are two basic reasons for this behaviour, namely the face that the contacting surfaces between the thrust ring and annular gasket and between the thrust ring and annular groove advance as the degree of compression of the assembly increases, and the fact that the thrust ring on becoming compressed tends to assume the shape of the surfaces with which it is in contact, to determine internal stresses of hydrostatic type.

This advancing contact produces a gradual increase in the rigidity of the thrust ring as it continuously adds new restraints to the structure.

For its part, the hydrostatic stressing arises gradually as the contact surfaces enlarge and prevent free flow of the material of the thrust ring, to determine a large increase in rigidity, depending on the coefficient of cubic compressibility of the material.

The object of the present invention is to obviate said drawback by a front-sealing gasket assembly in which the thrust by which the thrust ring presses the annular gasket varies as little as possible as the degree of compression of the assembly varies in proximity to its working position, so that it remains as close as possible to an optimum predetermined value.

Said object is attained by the invention as characterised in the claims.

The new conformation of the thrust ring according to the invention is such that, firstly, the contact surfaces between the thrust ring and annular gasket and between the thrust ring and annular cavity are properly defined a priori and do not increase substantially as the degree of compression increases (ie as the distance between the first and second member decreases). Moreover, the thrust ring is subjected mainly to shear stresses with the result that the increase in the thrust produced by the thrust ring on compression increase in proximity to the working position is small or in any event less than in gasket assemblies of known type.

The shape of the annular gasket seal lip is such as to prevent passage of contaminants (in particular dust particles) from the external environment and is also such as to undergo only limited wear and to itself induce only limited wear of the gasket and of the surface in contact with it.

Further characteristics and advantages of the invention will be more apparent from the detailed description of a prefered but not exclusive embodiment thereof given hereinafter by way of non-limiting example with reference to the accompanying figures in which.

Figure 3:
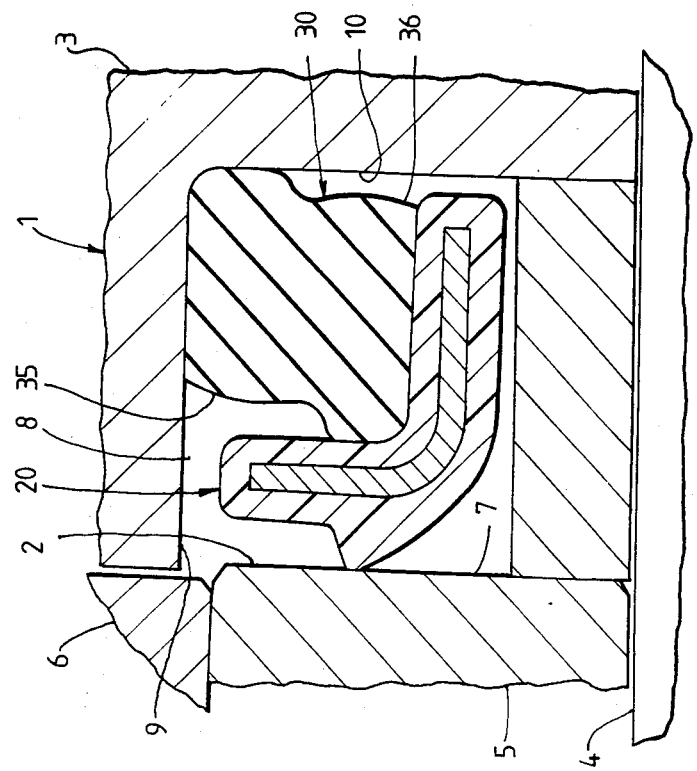
FIG. 3 is a view to an enlarged scale showing the gasket assembly of FIG. 1 in a completely compressed position.
Figure 1:
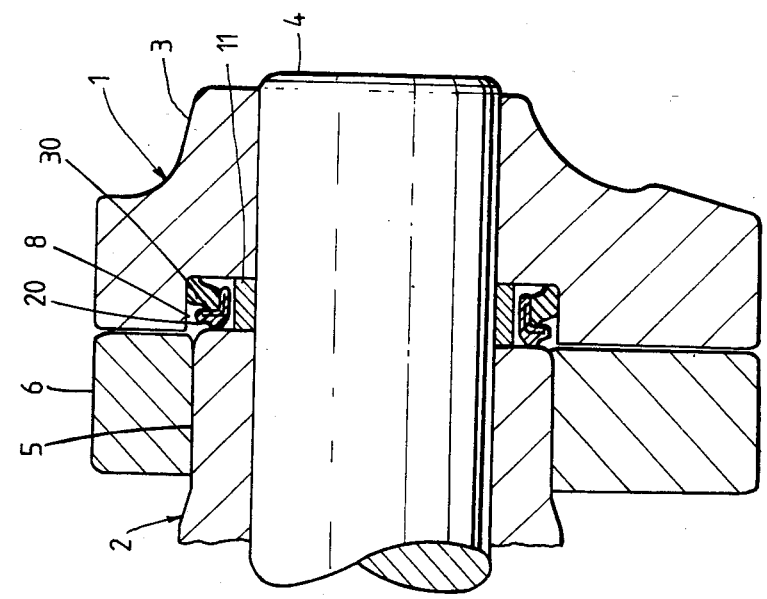
FIG. 1 is an axial section through an articulated joint between crawler track links, into which the gasket assembly according to the invention in inserted.

The annular front-sealing gasket assembly shown in the figures is applied to an articulated joint between the links of crawler tracks of known type for tracked vehicles.

The gasket assembly is located between a first member 1 defined by the end portion of an outer link 3 rigid with a pin 4, and a second member 2 defined by the end of a bushing 5 which partly surrounds the pin 4. The bushing 5 can rotate freely and coaxially on the pin 4.

The inner link 6 of the articulated joint is rigid with the bushing 5.

The bushing 5 possesses a flat, substantially radial end surface 7.

The first member 1 possesses an annular cavity 8 facing the end surface 7 and bounded internally by a cylindrical axial surface 9 and a radial surface 10. The radial surface 10 faces the radial surface 7.

The radially most inner zone of the cavity 8 opens on to the pin 4 and is occupied by a spacer element 11 of rectangular cross-section disposed about the pin 4.

The cavity 8 is therefore defined between the surfaces 9 and 10 and bounded by the outer axial surface 12 of the spacer 11. That cavity side in proximity to the radial surface 7 of the bushing 5 remains open.

The spacer 11 serves to limit the short axial sliding movements of the bushings 5 on the pin 4. In this respect, the radial front face 13 of the spacer 11 opposes the radial surface 7, and comes into contact with it when the links 6 and 3 are at their minimum distance apart.

When the articulated joint is assembled, the radial surface 7 is almost in contact with the radial surface 13. When the machine is in use, this distance varies between a maximum value D (shown in FIG. 2) and a minimum value of zero (position shown in FIG. 3).

The purpose of the gasket assembly is to hermetically seal and protect from the external environment the engagement surfaces between the bushing 5 and pin 4, and is located between the cavity 8 and the radial surface 7.

The gasket assembly is composed substantially of an annular gasket 20 arranged to form a front seal against the radial surface 7, and a thrust ring 30 housed in the annular cavity 8 and arranged to elastically urge the annular gasket 20 in an axial direction. The thrust ring 30 and gasket 20 have the same axis as the bushing 5 and pin 4.

In axial section, the annular gasket 20 is substantially of L shape, with its concave profile facing the annular cavity 8 and convex profile partly facing the radial surface 7 and partly facing the spacer 11.

Said concave profile comprises an axial annular surface 21 facing the axial surface 9, and a radial surface 22 facing the radial surface 10.

That part of the convex profile facing the radial surface 7 possesses, when seen in cross-section, an angular lip 25 bounded by a straight upper side 23 and an arcuate lower side 24. The edge of the lip 25 presses against the radial surface 7 and defines a thin annular contact strip which separates the external environment from the environment internal to the gasket. The angle at the vertex between the side 23 and side 24 is between 90 and 120 degrees, and the angle formed between the side 23 and the radial surface 7 is between 60 and 75 degrees.

The described profile of the lip 25 is excellent to prevent passage of contaminants originating from the external environment while at the same time favouring a slight seepage of oil, which although not progressing to the outside lubricates the seal lip in such a manner that it undergoes only limited wear and itself induces only limited wear of the bushing.

The annular gasket 20 is of suitable material, and in its interior it can comprise a rigid ring 26 substantially of L shape in section. The ring 26 can either entirely incorporated within the body of the annular gasket 20 (as shown in the figures) or can project partially from it. For example the axial portion of the ring 26 can project to act as the axial portion of the gasket itself. The ring 26 makes the annular gasket 20 rigid, so that although this latter is subjected to the thrust produced by the thrust ring 30 it does not undergo deformation, and during the use of the machine moves only by translation in the axial direction as the distance D varies. The ring 26 need not be provided, for example if the material of the gasket 20 is such as to sufficiently resist the thrust of the ring 30.

The thrust ring 30 possesses an axial outer face 31 which rests against the axial surface 9, a radial outer face 32 which rests against the radial surface 10, an axial inner face 33 which rests against the axial surface 21 of the gasket 20 and a radial inner face 34 which rests against the radial surface 22.

The ring 30 also comprises a central portion of substantially constant thickness in cross-section, and bounded by a first lateral face 35 facing outwards and a second lateral face 36 facing inwards. The two lateral faces 35 and 36 are substantially straight and parallel, and their distance apart defines said thickness of the central portion. They are inclined at about 60 degrees to the assembly axis.

The lateral face 35 meets the inner radial face 34 by way of an arcuate portion 37 forming a substantially right angle to the radial face 34 (said angle can also be acute). The other end of the lateral face 35 directly meets the axial face 31, forming an angle of about 120 degrees with it.

The lateral face 36 meets the outer radial face 32 by way of an arcuate portion 38 forming a substantially right angle with the radial face 32 (said angle can also be acute). The other end of the lateral face 36 directly meets the axial face 33, forming an angle of about 120 degrees with it.

By virtue of this conformation, between the face 34 and portion 37 there is defined a forwardly extending ring portion forming substantially a right angle therewith, and between the face 32 and portion 38 there is defined a rearwardly extending ring portion forming substantially a right angle therewith. The distance in the radial direction between the two portions 37 and 38 is equal to $\frac{1}{2}$-$\frac{1}{4}$ of the entire height of the thrust ring 30.

The ring 30 is suitable elastomer material able to apply the predetermined axial thrust to the gasket 20 to attain optimum front sealing when in the working position.

Figure 2:
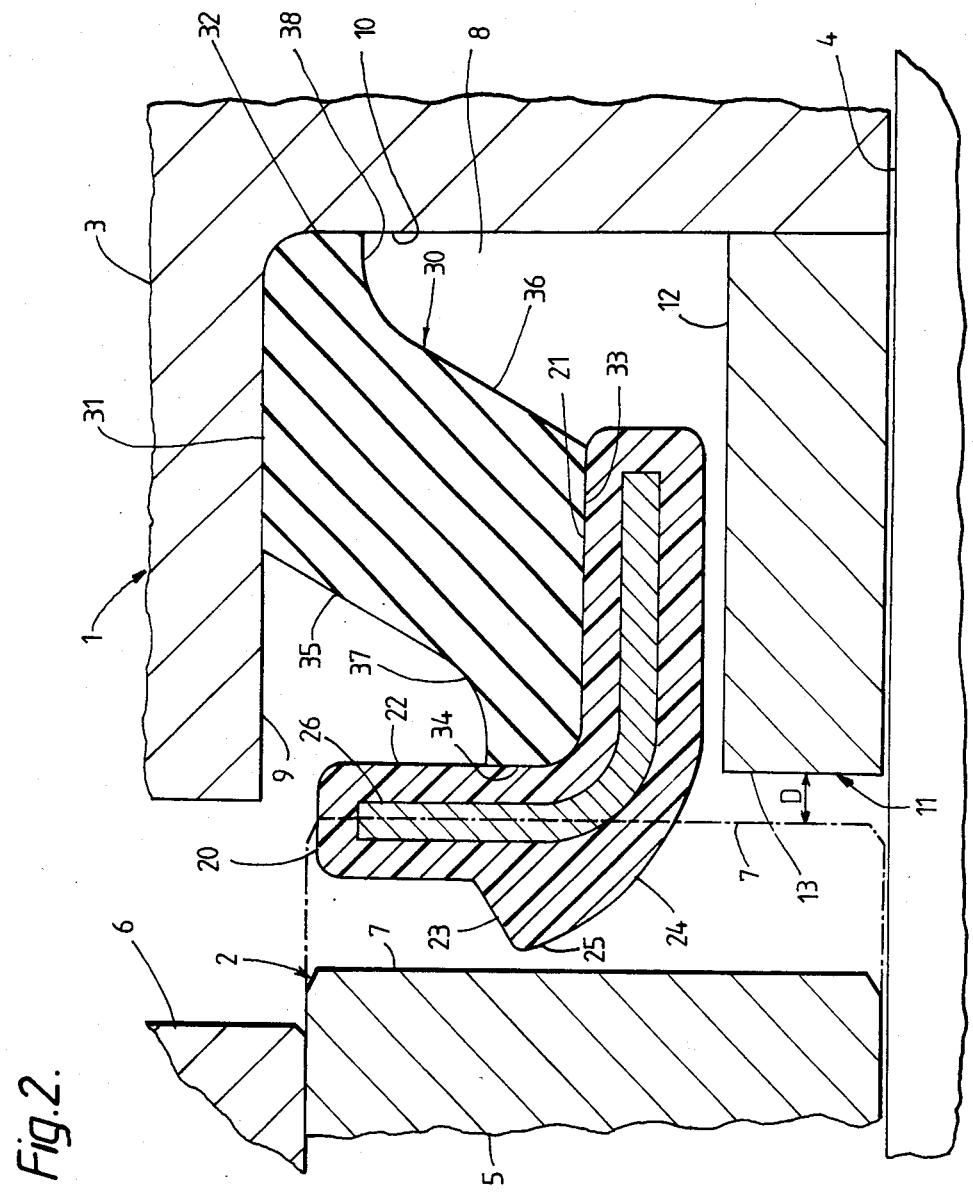
FIG. 2 is a view to an enlarged scale showing the gasket assembly of FIG. 1 in a non-compressed position.

Passing from the configuration shown in FIG. 2 to that shown in FIG. 3, the gasket assembly is shown compressed to its maximum amount between the surface 7 and the annular cavity 8, whereas the area of the contacting surfaces between the face of the thrust ring 30 and surface of the gasket 20 and between the face of the thrust ring 30 and cavity 8 remains substantially constant. This is due mainly to the portions 37 and 38 which withdraw the central portion of the ring from the surfaces 10 and 22 to prevent increase in the contact between these latter and the thrust ring 30.

Moreover, the thrust ring 30 deforms mainly by flexural deformation (as can be seen in FIG. 3).

These facts mean that the axial thrust which the ring 30 transmits to the gasket 20 does not undergo considerable increase over its predetermined optimum value as the degree of compression (ie reduction in the distance D) in proximity to its working position increases.

The surfaces 21 and 22 of the annular gasket 20 are roughened to increase friction between these surfaces and the faces 33 and 34 of the thrust ring 30. This obviates any danger of rotary slippage between the gasket 20 and ring 30 when the machine is in use.

Obviously the illustrated gasket assembly can undergo numerous modifications in terms of the practical nature of the described constructional details.

We claim:

1. An annular front-sealing gasket assembly located between a first and second member which rotate one relative to the other about a common axis, said first member comprising an annular cavity (8) defining a substantially axial surface (9) and a substantially radial surface (10), said second member comprising a substantially radial end surface (7), the gasket assembly being disposed in contact with said surfaces (7), (9) and (10), characterised by comprising:

an annular gasket means (20) arranged to form an axial seal against said radial surface (7) of the first member, said annular gasket means (20) having a substantially L-shaped section the concave profile of which faces the interior of the annular cavity and comprises a substantially axial surface (21) facing the axial surface (9) of the annular cavity, and a substantially radial surface (22) facing the radial surface (10) of the annular cavity (8);

an annular thrust means (30) arranged to elastically and axially urge the annular gasket means (20), said annular thrust means (30) having a substantially axial outer face which rests against said axial surface (9) of the annular cavity (8), a substantially radial outer face (32) which rests against said radial surface (10) of the annular cavity (8), substantially axial inner face (33) which rests against said axial surface (22) of the gasket means (20), and a substantially radial inner face (34) which rests against said radial surface (22) of the gasket means (20); said thrust means (30) further having a first and a second lateral face (35) and (36) which oppose each other and are inclined to the common axis of rotation to define a central portion of substantially constant thickness, said first lateral face (35) meeting said inner radial face (34) by way of a portion (37) forming a substantially right or acute angle with the radial face (34), said second lateral face (36) meeting said outer radial face (32) by way of a portion (38) forming an almost right or acute angle with the radial face (32), the distance in the radial direction between said meeting portions (37) and (38) being equal to ½-¼ of the entire sectional height of the thrust means (30).

2. A gasket assembly as claimed in claim 1, characterised in that the lateral faces (35) and (36) are substantially straight and inclined at about 60 degrees to the assembly axis.

3. A gasket assembly as claimed in claim 1, characterised in that the annular gasket means (20) comprises in section a lip (25) bounded by an upper side (23) and an arcuate lower side (24) (24), the angle at the vertex between said sides (23) and (24) being between 90 and 120 degrees, and the angle formed between the side (23) and the radial surface (7) being between 60 and 75 degrees.

4. A gasket assembly as claimed in claim 1, characterised in that said surfaces (21) and (22) of the annular gasket means (20) are roughened.

5. A gasket assembly as claimed in claim 1, characterised in that said annular gasket means (20) comprises a rigid ring (26) arranged to stiffen the means (20) and incorporated either entirely or partially into its interior.

* * * * *